United States Patent
Liu et al.

(10) Patent No.: US 10,675,832 B2
(45) Date of Patent: Jun. 9, 2020

(54) TRANSPARENT, END-FRAY AND EMI RESISTANT TEXTILE SLEEVE AND METHOD OF CONSTRUCTION THEREOF

(71) Applicant: Federal-Mogul Powertrain, Inc., Southfield, MI (US)

(72) Inventors: Xiaoxiao Liu, Kanagawa (JP); Masakazu Katoh, Aichi (JP)

(73) Assignee: Federal-Mogul Powertrain LLC, Southfield, MI (US)

( * ) Notice: Subject to any disclaimer, the term of this patent is extended or adjusted under 35 U.S.C. 154(b) by 320 days.

(21) Appl. No.: 15/176,584

(22) Filed: Jun. 8, 2016

(65) Prior Publication Data

US 2016/0358690 A1 Dec. 8, 2016

Related U.S. Application Data

(60) Provisional application No. 62/172,361, filed on Jun. 8, 2015.

(51) Int. Cl.
*B32B 1/08* (2006.01)
*B32B 5/02* (2006.01)
(Continued)

(52) U.S. Cl.
CPC .............. *B32B 1/08* (2013.01); *B32B 5/02* (2013.01); *B32B 5/024* (2013.01); *B32B 5/028* (2013.01);
(Continued)

(58) Field of Classification Search
CPC ............... D03D 15/00; D03D 15/0027; D03D 15/0033; D03D 15/0094; D03D 15/02; D03D 1/0035; D03D 1/0058; D03D 3/02; D03D 47/34; D03D 1/0041; D03D 1/0088; D03D 13/004; D03D 2700/0137; H01B 7/1805; D10B 2401/16; H02G 3/0481;
(Continued)

(56) References Cited

U.S. PATENT DOCUMENTS

| 4,197,345 A | 4/1980 | Worrall |
| 5,728,448 A | 3/1998 | Okeya et al. |

(Continued)

FOREIGN PATENT DOCUMENTS

WO 2007117883 A1 10/2007

OTHER PUBLICATIONS

International Search Report, dated Oct. 7, 2016 (PCT/US2016/036387).

*Primary Examiner* — Walter Aughenbaugh
(74) *Attorney, Agent, or Firm* — Robert L. Stearns; Dickinson Wright, PLLC

(57) ABSTRACT

A woven sleeve and method of construction thereof is provided. The sleeve has a wall with opposite edges extending lengthwise along a longitudinal axis between opposite ends, wherein the opposite edges are wrappable into overlapping relation with one another to contain the wires within a cavity of the sleeve. The wall is constructed from warp yarns extending along the longitudinal axis and fill yarns extending transversely to the warp yarns. The fill yarns are provided as transparent or substantially transparent monofilaments and the warp yarns are provided as yarns including a multifilament yarn and at least one conductive wire, wherein the conductive wire wrapped about the multifilament yarn.

6 Claims, 3 Drawing Sheets

(51) Int. Cl.
  *D03D 1/00* (2006.01)
  *H01B 7/18* (2006.01)
  *D03D 15/00* (2006.01)
  *D03D 15/02* (2006.01)
  *B32B 5/10* (2006.01)
  *B32B 5/08* (2006.01)
  *B32B 5/12* (2006.01)

(52) U.S. Cl.
  CPC .................. *B32B 5/08* (2013.01); *B32B 5/10* (2013.01); *B32B 5/12* (2013.01); *D03D 1/0035* (2013.01); *D03D 1/0058* (2013.01); *D03D 15/0027* (2013.01); *D03D 15/0033* (2013.01); *D03D 15/0094* (2013.01); *D03D 15/02* (2013.01); *H01B 7/1805* (2013.01); *D10B 2331/04* (2013.01); *D10B 2331/301* (2013.01); *D10B 2401/16* (2013.01)

(58) Field of Classification Search
  CPC ................ H02G 3/0406; H02G 15/18; D07B 2201/2093; D07B 2201/20903; Y10T 428/1362; Y10T 428/2929; Y10T 442/322; Y10T 442/3228; B32B 1/08; B32B 5/02; B32B 5/024; B32B 5/028; B32B 5/08; B32B 5/10; B32B 5/12
  USPC ............. 174/350, 126.1; 138/383 R, 387 R; 428/36.1, 373, 364, 375, 277, 394, 221, 428/398; 139/387 R; 442/200, 208, 209, 442/213
  See application file for complete search history.

(56) References Cited

U.S. PATENT DOCUMENTS

| | | |
|---|---|---|
| 7,576,286 B2 | 8/2009 | Chen |
| 2002/0064653 A1* | 5/2002 | Ladika ............... A61F 13/4902 428/364 |
| 2002/0098759 A1* | 7/2002 | Salway ................... D03D 9/00 442/200 |
| 2002/0157172 A1* | 10/2002 | Matsushima ........ D03D 1/0094 2/311 |
| 2004/0200536 A1 | 10/2004 | Strasser et al. |
| 2007/0275199 A1 | 11/2007 | Chen |
| 2008/0035365 A1 | 2/2008 | Johnsson |
| 2009/0218002 A1* | 9/2009 | Kashihara ........... D03D 1/0041 139/433 |
| 2009/0272570 A1 | 11/2009 | Chen |
| 2010/0084179 A1 | 4/2010 | Harris et al. |
| 2014/0262478 A1 | 9/2014 | Harris et al. |

* cited by examiner

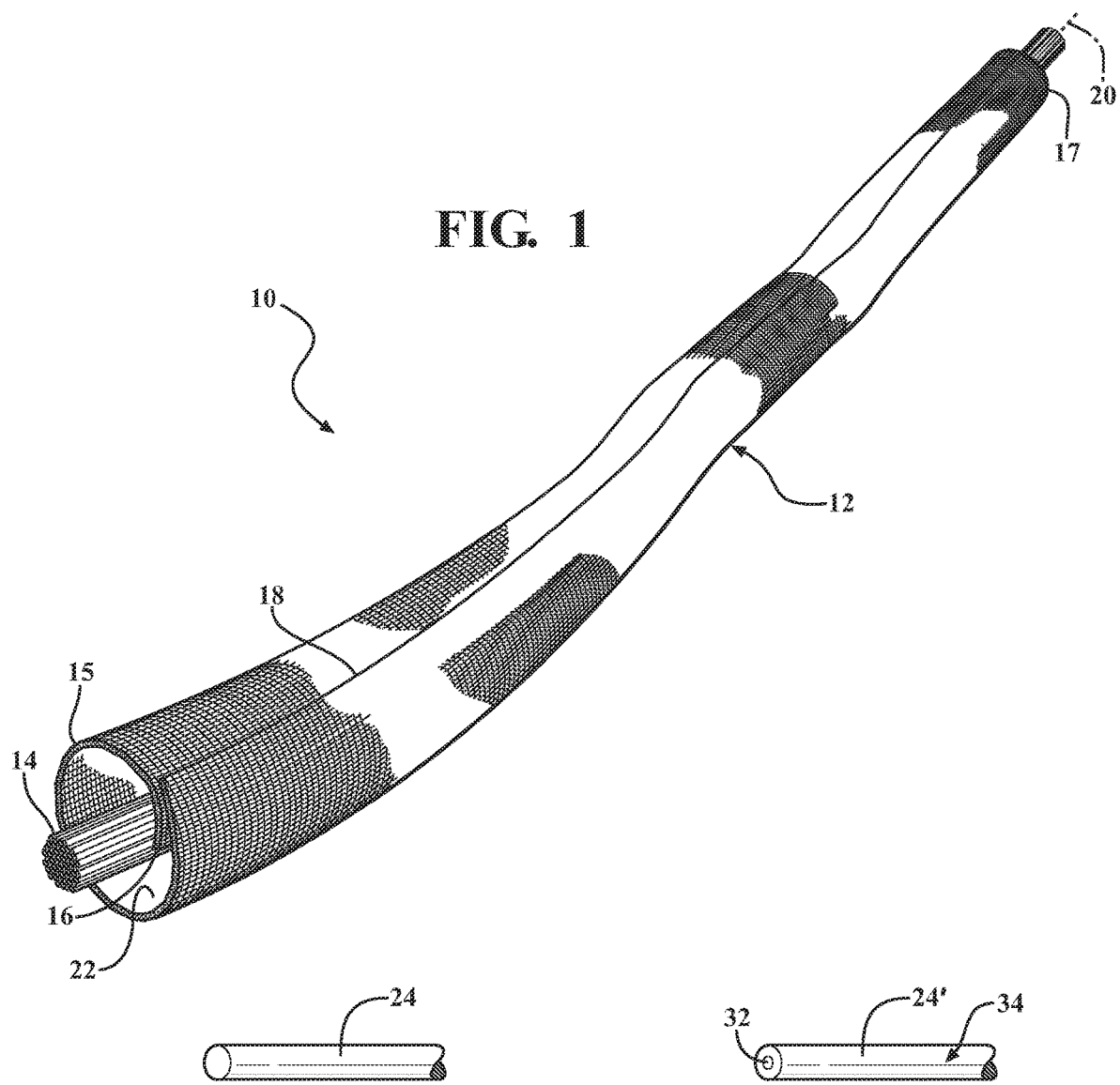
FIG. 1
FIG. 2   FIG. 2A
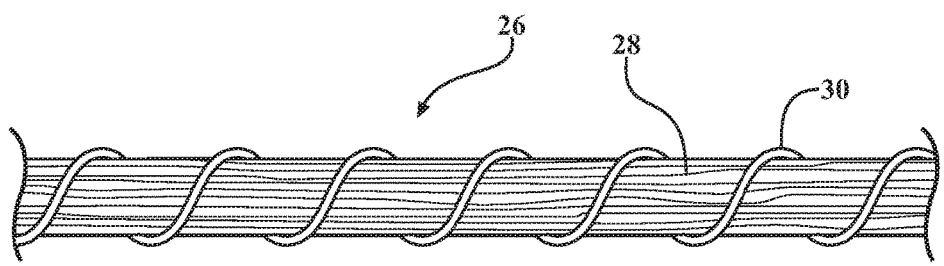
FIG. 3

TRANSPARENT, END-FRAY AND EMI RESISTANT TEXTILE SLEEVE AND METHOD OF CONSTRUCTION THEREOF

CROSS-REFERENCE TO RELATED APPLICATION

This application claims the benefit of U.S. Provisional Application Ser. No. 62/172,361, filed Jun. 8, 2015, which is incorporated herein by reference in its entirety.

BACKGROUND OF THE INVENTION

1. Technical Field

This invention relates generally to textile sleeves for protecting elongate members, and more particularly to woven EMI resistant sleeves allowing the clear viewing of internal elongate members contained therein.

2. Related Art

It is known to wrap wires and wire harnesses in protective sleeves to provide protection to the wires against abrasion and the effects of electromagnetic energy in the form of electromagnetic interference (EMI). Unfortunately, although the known sleeves are effective at providing such protection, they conceal the elongate members contained therein against viewing, and in some applications, this is undesirable, such as in gaming and amusement machines, e.g. slot machines. In the gaming and amusement industry, laws require wires to be viewable to ensure the machine is in compliance with expected fairness regulations. As such, the wires are typically twisted with an additional wire to provide protection against EMI. However, this solution has been proven to provide relatively poor shielding against EMI; provides limited protection against abrasion, and is labor intensive in assembly, thereby adding cost to the manufacture of the machines.

SUMMARY OF THE INVENTION

One aspect of the invention provides a woven sleeve for routing and protecting wires from exposure to abrasion and EMI and for viewing the wires while contained in the sleeve. The sleeve has a wall with opposite edges extending lengthwise along a longitudinal axis between opposite ends, wherein the opposite edges are wrappable into overlapping relation with one another to contain the wires within a cavity of the sleeve. The wall is constructed from warp yarns extending along the longitudinal axis and fill yarns extending transversely to the warp yarns. The fill yarns are provided as transparent or substantially transparent monofilaments and the warp yarns are provided as yarns including a multifilament yarn and at least one conductive wire, wherein the conductive wire can be twisted or served about the multifilament yarn.

In accordance with another aspect of the invention, the multifilament warp yarns are bright colored yarns to enhance the ability to distinguish the wires contained within the cavity of the sleeve from the multifilament warp yarns.

In accordance with another aspect of the invention, at least some of the monofilament fill yarns can be provided as transparent or substantially transparent bicomponent monofilaments, including a substantially transparent central core and a substantially transparent outer sheath. The outer sheath has a lower melt temperature than the central core to facilitate bonding the outer sheath with the wires of the warp yarns, thereby acting to lock the wires in place and to prevent end fray upon cutting the ends of sleeve wall to the desired length. The central core is heat-settable to bias the opposite edges into overlapping relation with one another.

In accordance with another aspect of the invention, the wall can be processed in a single step if desired, such that the heat-set imparted in the central core and the melting of the outer sheath can be performed in a single operation.

In accordance with another aspect of the invention, the outer sheath can first be melted, thereby acting to lock the wires in place and further allowing the wall to be cut-to-length prior to heat-setting the central core, and then, upon cutting the wall to length, the wall can be subsequently wrapped and heat-set to maintain its wrapped configuration.

In accordance with another aspect of the invention, a method of constructing a protective textile sleeve for protecting an elongate wire extending therethrough is provided. The method including weaving a wall having opposite edges extending lengthwise along a longitudinal axis with warp yarns extending along the longitudinal axis and fill yarns extending transversely to the warp yarns. The method further includes providing the fill yarns as transparent or substantially transparent monofilaments and providing the warp yarns as yarns including a multifilament yarn and at least one conductive wire, wherein the conductive wire is twisted or served about the multifilament yarn.

In accordance with another aspect of the invention, the method can include providing the fill yarns as transparent or substantially transparent bicomponent monofilaments, including a substantially transparent central core and a substantially transparent outer sheath. The outer sheath is provided having a lower melt temperature than the central core to facilitate bonding the outer sheath with the wires of the warp yarns, thereby acting to lock the wires in place and to prevent end fray upon cutting the ends of sleeve wall to the desired length. The central core is provided as being heat-settable to bias the opposite edges into overlapping relation with one another.

In accordance with another aspect of the invention, the method can further include heat-processing the wall in a single step, including heat-setting the central core and at least partially melting the outer sheath in a single heat operation.

In accordance with another aspect of the invention, the method can further include melting the outer sheath in a first heating operation at a temperature sufficient to melt the outer sheath, but low enough to avoid heat-setting the central core, thereby locking the wires in place via the melted and subsequently solidified outer sheath. Then, the method can further include cutting the wall to the desired length, and then, wrapping the wall to bring the opposite edges into overlapping relation with one another and heat-setting the central core to maintain the wall in its wrapped configuration.

In accordance with another aspect of the invention, the method can further include providing the multifilament warp yarns as brightly colored yarns to enhance the ability to distinguish the wires contained within the cavity of the sleeve from the multifilament warp yarns. Accordingly, it should be recognized that the method includes providing the multifilament yarns having a color that is readily distinguishable from the color of the wires or wire sheathes extending through the cavity of the sleeve.

A sleeve constructed in accordance with the invention not only provides enhanced abrasion and EMI protection to wires contained therein, while allowing the wires contained within the sleeve to be viewed through the wall of the sleeve, but is economical in manufacture, and has an enhanced ability to remain in a self-curled configuration about the wires.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

FIG. 1 is a schematic perspective view of a woven, self-wrapping sleeve constructed in accordance with one aspect of the invention carrying and protecting elongate members therein;

FIG. 2 is an enlarged partial schematic view of a weft-wise extending yarn of the sleeve of FIG. 1 in accordance with one aspect of the invention;

FIG. 2A is an enlarged partial schematic view of a weft-wise extending yarn of the sleeve of FIG. 1 in accordance with another aspect of the invention;

FIG. 3 is an enlarged partial schematic view of a warp-wise extending hybrid yarn of the sleeve of FIG. 1 in accordance with one aspect of the invention;

DETAILED DESCRIPTION OF PREFERRED EMBODIMENTS

Figure 3A:
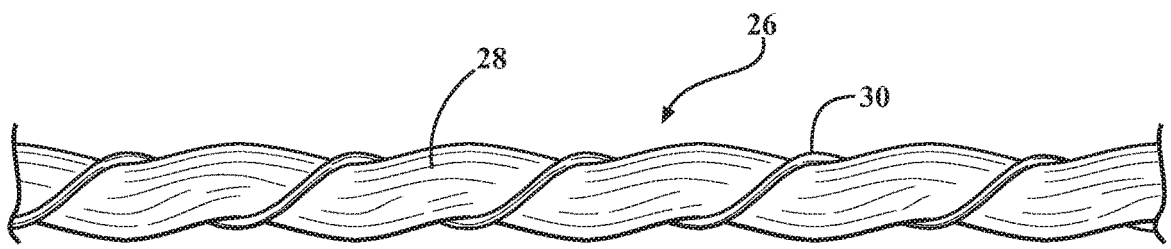
FIG. 3A is an enlarged partial schematic view of a warp-wise extending hybrid yarn of the sleeve of FIG. 1 in accordance with another aspect of the invention.
Figure 3B:
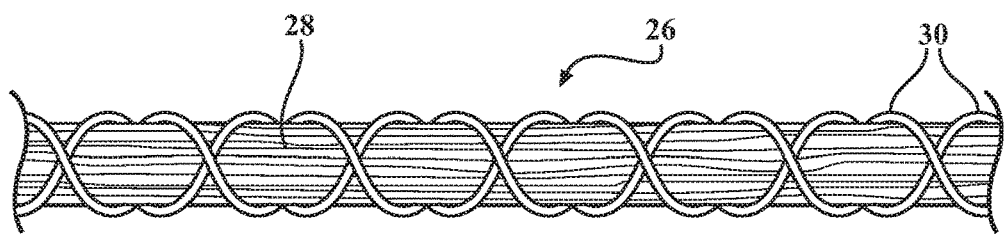
FIG. 3B is an enlarged partial schematic view of a warp-wise extending hybrid yarn of the sleeve of FIG. 1 in accordance with another aspect of the invention.

Referring in more detail to the drawings, FIG. 1 shows schematic representation of a woven, wrappable textile sleeve, referred to hereafter as sleeve 10, constructed in accordance with one aspect of the invention. The sleeve 10 has a wrappable elongate wall 12 for routing and protecting elongate members, such as wires, wires contained in sheaths or a bundled wire harness 14, for example, from exposure to abrasion, EMI and the ingress of contamination, debris and the like. The elongate wall 12 has opposite edges 16, 18 extending lengthwise along a longitudinal, central axis 20 between opposite ends 15, 17, wherein the edges 16, 18 are wrappable into overlapping relation with one another in "cigarette wrapped" fashion to fully enclose the elongate members 14 within a central cavity 22 of the sleeve 10. The cavity 22 is readily accessible along the full length of the central axis 20 so that the elongate members 14 can be readily disposed radially into the cavity 22, and conversely, removed from the cavity 22, such as during service. To provide protection to the elongate members 14 against abrasion, the wall 12 is woven with weft yarns, also referred to as fill yarns 24, provided as clear, transparent or substantially transparent monofilament yarns, for reasons discussed further below, that extend circumferentially in a weft-wise direction about the wall 12 and transversely to the central axis 20, and further, the fill yarns 24 can be provided, at least in part, as heat-settable monofilaments to facilitate biasing the opposite edges 16, 18 into self-curling, overlapping relation with one another. To provide protection to the elongate members 14 against EMI, the wall 12 is woven with hybrid warp yarns 26 extending lengthwise along the central axis 20. The hybrid warp yarns 26 include a multifilament yarn 28 and at least one continuous wire 30 interlocked with one another, wherein the wire 30 can be served about the multifilament yarn 28 (FIG. 3), twisted with the multifilament yarn 28 (FIG. 3A), or if a plurality of wires, such as two wires 30 are used, which is believed to be the presently preferred embodiment, the wires 30 can be helically wrapped in opposite S and Z helical directions about the multifilament yarn 28 (FIG. 3B). The multifilament yarns 28 provide enhanced coverage and assist in maintaining the wire or wires 30 in place by imparting friction on the wires 30, thus, inhibiting the wire(s) 30 from shifting relative to the multifilament yarn 28, thereby enhancing the ability to maintain effective protection to the elongate members 14 against EMI. To further facilitate locking the wires 30 in their intended, as woven location, thereby assuring optimal EMI protection, the fill yarns can be provided, at least in part, as bicomponent monofilaments 24' (FIG. 2A), including a central core 32 and an outer sheath 34, wherein the outer sheath 34 has a lower melt temperature than the central core 32 to facilitate melting, solidifying and bonding the outer sheath with the wires 30 of the warp hybrid yarns, thereby acting to lock the wires 30 in place, as woven, thereby ensuring the "as woven" pattern of the wires 30 is maintained. Further yet, the melted outer sheath 34 acts to bond the woven yarns/filaments 24', 26 to one another to prevent end fray at the ends 15, 17 upon cutting the sleeve wall 12 to its finished length. Further yet, with the central core 32 being heat-settable (without melting), the opposite edges 16, 18 can be readily biased via heat-set of the central core 32 to maintain the opposite edges 16, 18 in overlapping relation with one another, while providing the sleeve 10 with sufficient flexibility for routing around corners, for example.

Depending on the application needs, the wall 12 can be constructed having any suitable size, including length, width and diameter. When the wall 12 is heat-set and in its self-wrapped tubular configuration, generally free from any externally applied forces, the edges 16, 18 preferably overlap one another at least slightly to fully enclose the cavity 22, and thus, provide enhanced protection to the wires 14 contained in the cavity 22. The edges 16, 18 are readily extendable away from one another under an externally applied force sufficient to overcome the bias imparted by the heat-set fill monofilament yarns 24 (24') to at least partially open and expose the cavity 22. Accordingly, the wires 14 can be readily disposed into the cavity 22 during assembly or removed from the cavity 22 during service. Upon releasing the externally applied force, the edges 16, 18 return automatically to their overlapping, self-wrapped position under the bias imparted by the heat-set fill monofilament yarns 24, 24'.

The monofilament fill yarns 24 can be provided as any suitable clear (transparent) or substantially clear polymeric material, including a clear heat-settable polymeric material, such as clear polyphenylene sulfide (PPS) or polyethyleneterephthalate (PET), for example. In one exemplary sleeve embodiment, the monofilament yarns 24 were provided as clear PET having a diameter of about 0.25 mm and the wall 12 was formed having a width (dimension extending between the edges 16, 18 with the wall 12 in a flattened state) of about 42 mm, and having a pick per inch (PPI) of about 19, by way of example and without limitation.

Figure 4:
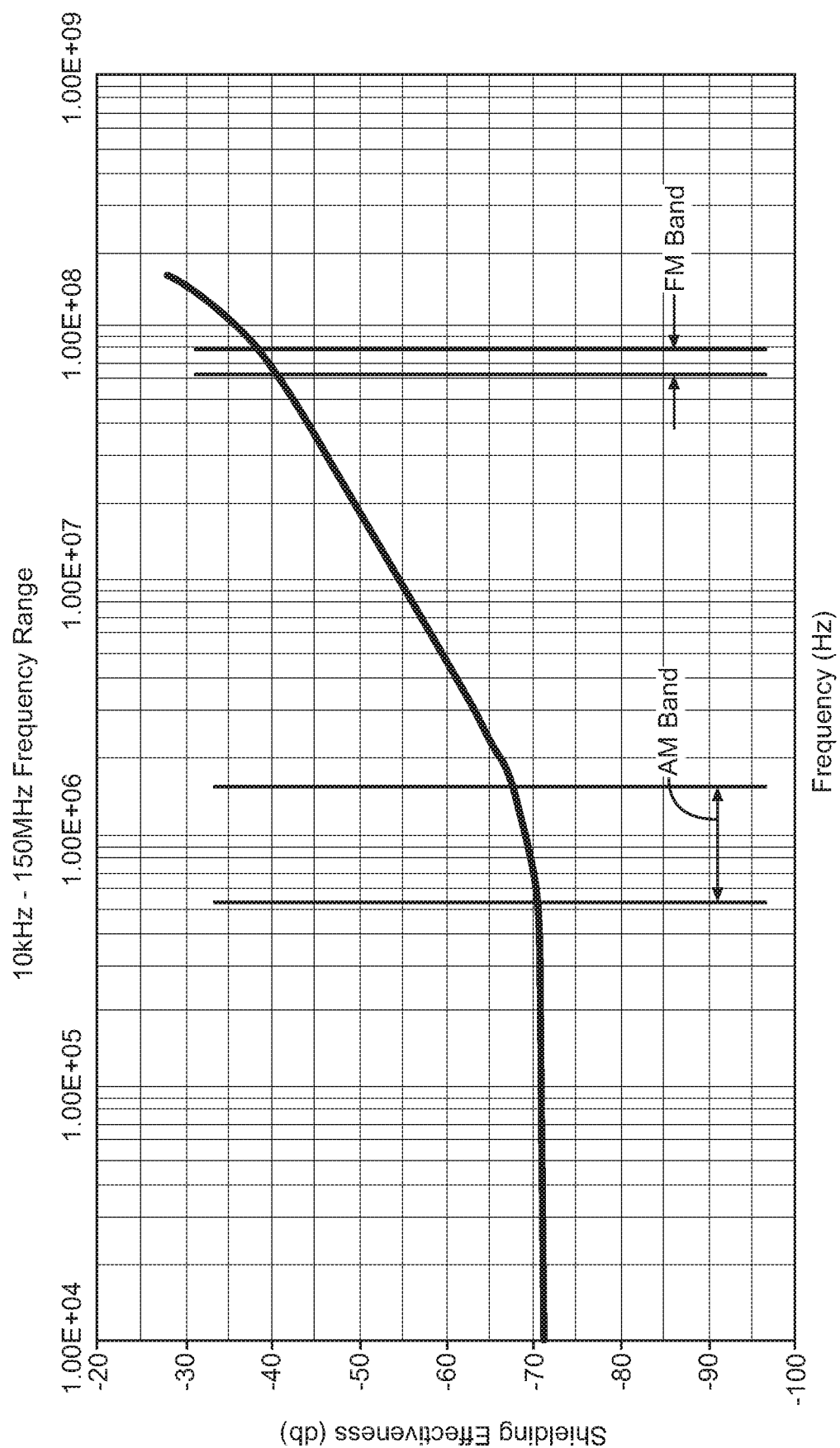
FIG. 4 is a graph representing the shielding performance of a sleeve constructed in accordance with one aspect of the invention.

The hybrid warp yarns 26 can include any suitable conductive wire material, and in one exemplary embodiment the wire 30 was provided as copper, while the multifilament yarn 28 was provided as a bright colored yarn, thereby allowing the wires 14 to be readily viewed and distinguished from the outer multifilament yarns 28 through the transparent fill yarn(s) 24, 24' and interstices in the wall 12 of the sleeve 10. Accordingly, it should be recognized that the multifilament yarns 28 can be provided having a color that is readily distinguishable from the color of the wires or wire sheathes 14 thereof extending through the cavity 22 of the sleeve 10. The multifilament yarn 28, depending on the application, can be formed from, by way of example and without limitations, polyester, nylon, polypropylene, polyethylene, acrylic, cotton, rayon, and fire retardant (FR) versions of all the aforementioned materials. In the exemplary embodiment, the hybrid yarns 26 were provided between about 50-60 ends, and having a denier between about 1600-1650. It was discovered that the relatively low number of ends provided the desired EMI protection, greater than −60 dB in AM band (FIG. 4), while also allowing the wires 14 contained within the cavity 22 to be readily seen through the wall 12, as required in some applications.

Figure 5A:
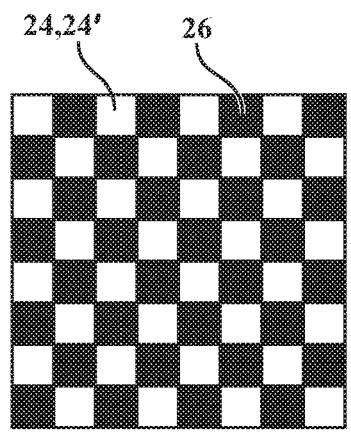
FIGS. 5A-5C illustrate different weave patterns that can be used to construct a sleeve in accordance with the invention.
Figure 5B:
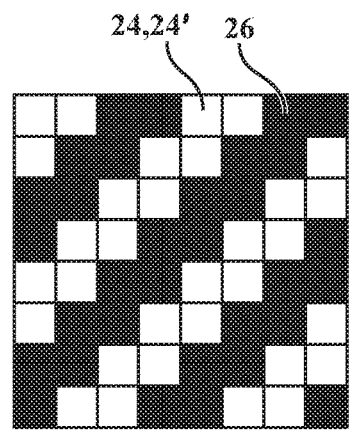
Figure 5C:
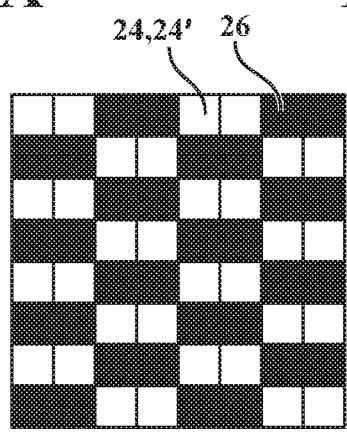

The yarns 24 (24'), 26 can be woven using a plain weave pattern (FIG. 5A), with each fill and warp yarn 24 (24'), 26 undulating in alternating fashion over and under one another, as is understood in the art of weaving; however, other weave patterns are contemplated herein, such as twill (FIG. 5B), basket (FIG. 5C), and satin or sateen, by way of example, which are also understood in the art of weaving.

In accordance with another aspect of the disclosure, a method of constructing a sleeve 10 is provided. The method includes weaving a wall 12 having opposite edges 16, 18 extending lengthwise along a longitudinal axis 20, with warp yarns 26 extending along the longitudinal axis 20 and fill yarn 24 (24') extending transversely to the warp yarns 26. The method further includes providing the fill yarn 24 (24') as transparent or substantially transparent monofilament(s) and providing the warp yarns 26 as yarns including a multifilament yarn 28 and at least one conductive wire 30, wherein the conductive wire 30 is twisted or served about the multifilament yarn 28.

The method can further include providing the fill yarn 24' as transparent or substantially transparent bicomponent monofilaments, including a substantially transparent central core 32 and a substantially transparent outer sheath 34. The outer sheath 34 is provided having a lower melt temperature than the central core 32 to facilitate bonding the outer sheath 34 with the wires 30 of the warp yarns 26, thereby acting to lock the wires 30 in place and to prevent end fray upon cutting the ends 15, 17 of sleeve wall 12 to the desired length. The central core 32 is provided as being heat-settable to bias the opposite edges 16, 18 into overlapping relation with one another. The respective sheath/core can be provided as PE/PET or PE/PP, by way of example and without limitation.

The method can further include heat-processing the wall 12 in a single step, including heat-setting the central core 32 and at least partially melting the outer sheath 34 in a single heat operation. Accordingly, the fill yarn 24' can be both heat-set and bonded to the wire 30 in a single operation, thereby streamlining the manufacture process.

In accordance with another aspect of the disclosure, the method can further include melting the outer sheath 34 in a first heating operation at a temperature sufficient to at least partially melt the outer sheath 34, but low enough to avoid heat-setting the central core 32, thereby locking the wires 30 in their "as woven" position via the melted and subsequently cooled and solidified outer sheath 34. Then, the method can further include cutting the ends 15, 17 of the wall 12 to the desired length without end fray due to the bonded fill and warp yarns 24', 26, then, wrapping the wall 12 to bring the opposite edges 16, 18 into overlapping relation with one another, and then heat-setting the central core 32 at a sufficient temperature, which can be greater than the temper used to melt the outer sheath 34, over a sufficient time to maintain the wall 12 in its biased wrapped configuration.

Many modifications and variations of the present invention are possible in light of the above teachings. It is, therefore, to be understood that the invention may be practiced otherwise than as specifically described, and that the scope of the invention is defined by claims allowed.

What is claimed is:

1. A protective textile sleeve for routing and protecting elongate members from exposure to abrasion, from exposure to EMI, and for viewing the elongate members contained in the sleeve, comprising:
a woven wall having opposite edges extending lengthwise along a longitudinal axis between opposite ends, said opposite edges being wrapped into overlapping relation with one another to contain the elongate members within a cavity of the sleeve, said wall having warp yarns extending along said longitudinal axis and fill yarns extending transversely to said warp yarns, said fill yarns being substantially transparent monofilaments to allow the elongate members within the cavity to be viewed from outside of said protective textile sleeve and said warp yarns including a multifilament warp yarn and at least one conductive wire twisted or served about said multifilament warp yarn, said fill yarns being bonded with said at least one conductive wire.

2. The protective textile sleeve of claim 1 wherein said multifilament warp yarns are colored to enhance the ability to distinguish the elongate members contained within the cavity of the sleeve from the multifilament warp yarns.

3. The protective textile sleeve of claim 1 wherein at least some of said monofilament fill yarns are provided as bicomponent monofilaments, including a substantially transparent central core and a substantially transparent outer sheath, said outer sheath having a lower melt temperature than said central core, said central core being heat-set to bias said opposite edges into overlapping relation with one another.

4. The protective textile sleeve of claim 1 wherein each of said fill yarns is provided with a central core and an outer sheath and wherein said outer sheath is meltable and said central core is heat-settable in a single operation.

5. The protective textile sleeve of claim 1 wherein each of said fill yarns is provided with a central core and an outer sheath and wherein said outer sheath is meltable at a temperature which is insufficient to heat-set said central core.

6. The protective textile sleeve of claim 1 wherein said at least one conductive wire includes a plurality of conductive wires, at least some of said plurality of conductive wires being wrapped in opposite helical directions about said multifilament warp yarn.

* * * * *